United States Patent [19]

Phipps

[11] 4,211,739
[45] Jul. 8, 1980

[54] FOAM EXTRUSION APPARATUS AND METHOD

[75] Inventor: Arthur L. Phipps, Los Osos, Calif.

[73] Assignee: Condec Corporation, Old Greenwich, Conn.

[21] Appl. No.: 922,542

[22] Filed: Jul. 10, 1978

[51] Int. Cl.² ........................ B29D 27/00; B29F 3/02
[52] U.S. Cl. .................................. 264/51; 264/562; 264/101; 264/178 R; 264/DIG. 78; 425/4 C; 425/71; 425/381; 425/466; 425/817 C; 425/DIG. 60
[58] Field of Search ............... 264/51, 101, 102, 209, 264/289, 13, 14, 178 R, 562, DIG. 78; 425/62, 72 R, 4 R, 381, 466, 4 C, 817 C, DIG. 60, 71

[56] References Cited

U.S. PATENT DOCUMENTS

| | | | |
|---|---|---|---|
| 1,941,420 | 12/1933 | Siegfried | 264/102 X |
| 2,007,389 | 7/1935 | Taylor et al. | 264/101 X |
| 2,816,322 | 12/1957 | Bjorksten | 264/209 |
| 3,169,272 | 2/1965 | Maxson | 264/209 X |
| 3,311,678 | 3/1967 | Brock et al. | 264/102 X |
| 3,558,753 | 1/1971 | Edlin | 264/102 X |
| 3,584,108 | 6/1971 | Nelson et al. | 264/289 |
| 3,704,083 | 11/1972 | Phipps | 264/51 |
| 3,822,331 | 7/1974 | Cogliano | 264/101 X |
| 4,044,084 | 8/1977 | Phipps | 264/51 |

FOREIGN PATENT DOCUMENTS

| | | | |
|---|---|---|---|
| 1277551 | 9/1968 | Fed. Rep. of Germany | 264/102 |
| 802261 | 10/1958 | United Kingdom | 425/62 |
| 1233088 | 5/1971 | United Kingdom | 264/101 |

*Primary Examiner*—Philip Anderson
*Attorney, Agent, or Firm*—Maky, Renner, Otto & Boisselle

[57] ABSTRACT

A foam extrusion apparatus and method employs tandem extruders mounted on horizontal rails for movement toward and away from the end of a vacuum chamber which is in the form of an elongated inclined barometric leg. The upper end of the chamber is closed by a substantial bulkhead also supported on rails and held in inclined position to close the end of the chamber when moved thereagainst. A die is positioned on the inside of the bulkhead and aligned with the leg when closed. The extruders are connected to the die through a length of pipe supported through the bulkhead by a stainless steel bellows. The pipe externally of the bulkhead is provided with a circulating jacket for temperature control. The die is adjustable externally of the bulkhead. The extruders, die and bulkhead are movable as a unit or separately toward and away from the chamber to provide access to the die and the interior of the chamber.

53 Claims, 7 Drawing Figures

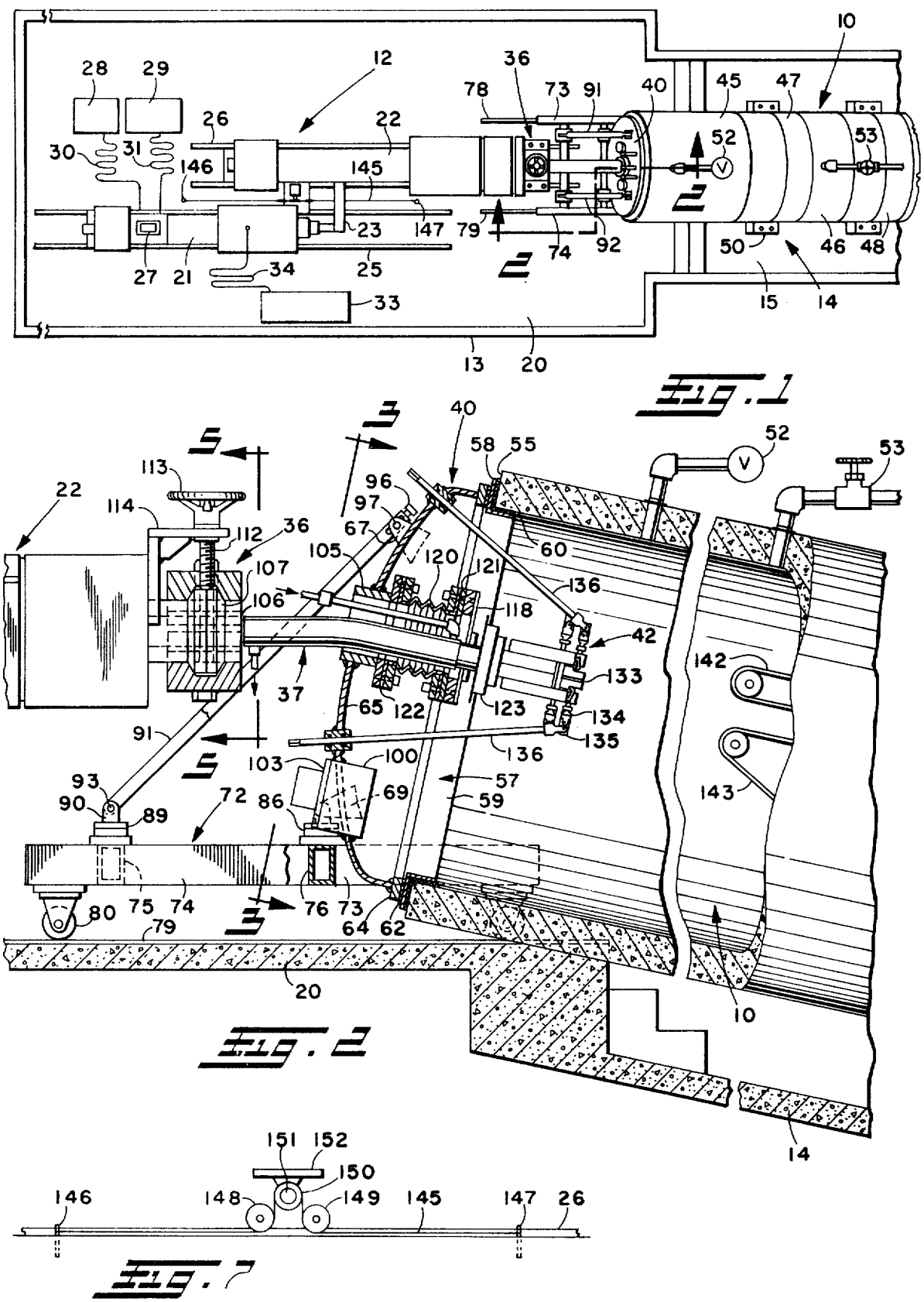

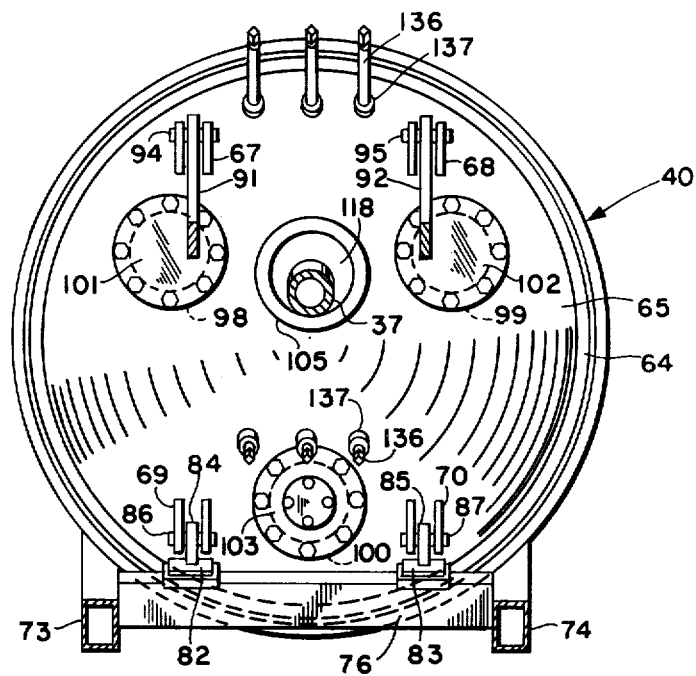
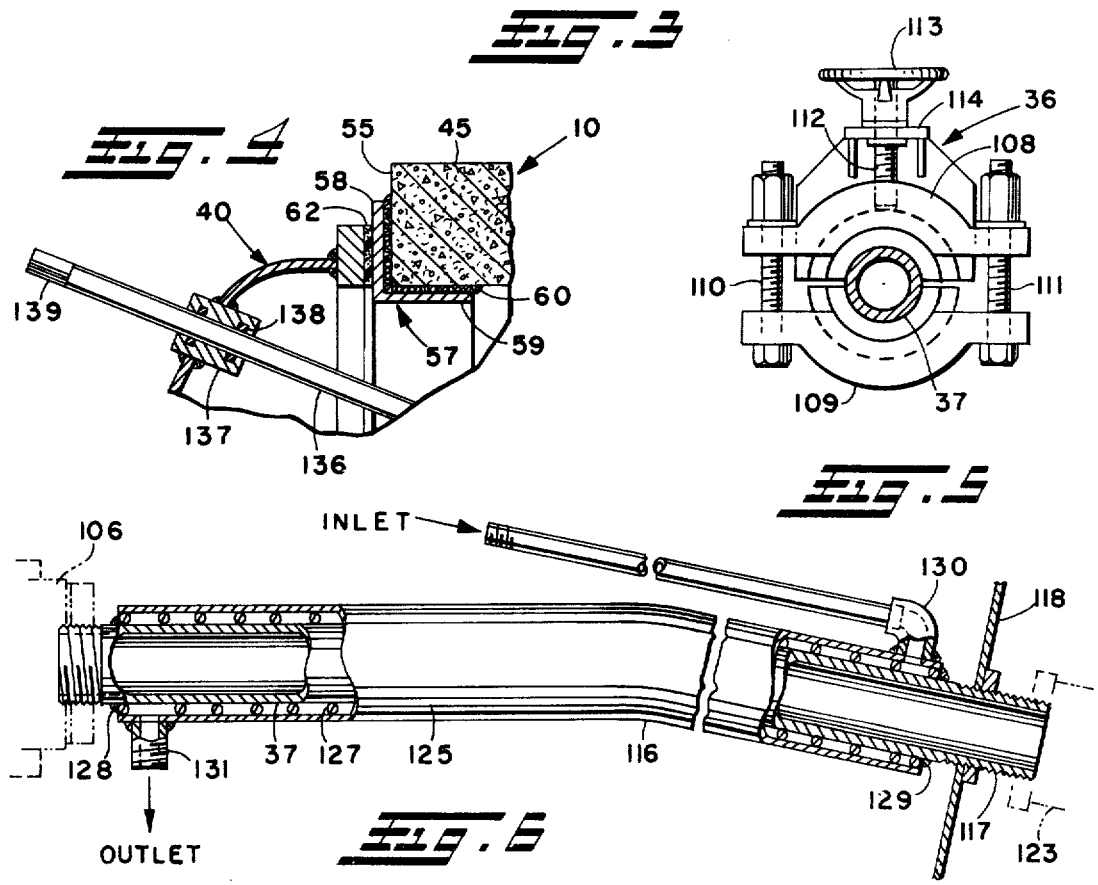

FOAM EXTRUSION APPARATUS AND METHOD

This invention relates generally as indicated to a foam extrusion apparatus and method and more particularly to the combination of a vacuum chamber, a closure for the chamber having the extruders on one side and the die on the opposite side, the extruder, closure and die being movable as a unit toward and away from the chamber.

BACKGROUND OF THE INVENTION

It is known that the formation of extruded foams in the form of billets or boards is enhanced by the employment of a vacuum chamber so that the expansion of the foam is accomplished under subatmospheric pressure. Examples of vacuum foam extrusion apparatus and methods may be seen in prior U.S. Patents to Nelson et al No. 3,584,108, Maxson No. 3,169,272, Cogliano No. 3,822,331, and U.K. Pat. No. 1,233,088. In vacuum extrusion technology, the most difficult to solve problem is the curing and extraction of the material, especially delicate or fragile materials from the vacuum chamber. This problem has been solved by the employment of an inclined barometric leg as seen in applicant's prior U.S. Pat. Nos. 3,704,083 and 4,044,084.

In a large scale plant relatively large single or tandem extruders are employed which are connected to a die within the vacuum chamber. In addition to the relatively large and heavy die, additional equipment is employed within the chamber such as shaping or forming mechanisms and conveyors. Although the process is continuous during production, access to the interior of the chamber is required periodically for cleaning, maintenance, and equipment removal and replacement.

SUMMARY OF THE INVENTION

In accordance with the present invention there is provided an elongated vacuum chamber having an end face which is normal to the axis of the chamber. A closure for the end face in the form of a substantial bulkhead also supports the die for the extrusion line on the interior thereof. An extruder is connected to the die through the closure by a section of pipe provided with a heat exchange circulation jacket. The bulkhead is supported for movement toward and away from the vacuum chamber and is held in a plane parallel to the end face of the chamber so that the vacuum chamber may be opened and closed simply by moving the bulkhead toward and away from the chamber. The bulkhead and the extruder are mounted for movement as a unit or independently on horizontal sets of rails. In this manner access may readily be provided to the interior of the chamber and the chamber may readily be opened and closed. Also, the die is adjustable and may be adjusted remotely from the exterior of the bulkhead.

It is accordingly a principal object of the present invention to provide a foam extrusion line which includes a vacuum chamber and an extruder with a closure for the chamber, the closure and extruder being mounted for movement in unison or independently toward and away from the chamber.

Another important object is the provision of a process and apparatus for extruding foamable material utilizing a vacuum chamber having an end face normal to the axis of the chamber and having a closure for the end face which is supported for movement toward and away from the chamber but in a plane parallel to the end face at all positions thereof.

Another important object is the provision of a vacuum chamber in a foam extrusion line having an inclined end face with a closure for the end face and an extrusion die supported on the closure having an outlet orifice extending normal to the end face.

A further important object is the provision of such closure which itself supports the die and which includes means externally thereof to adjust the die.

Still another object is the provision of an axially elongated vacuum chamber in an extrusion line wherein horizontal rail means are provided at the entrance end of the chamber extending axially of the chamber with an extruder and a closure mounted on the rail means for movement toward and away from the chamber to open and close the chamber, both the extruder and the closure being coupled together for movement in unison or independently.

Still another object is the provision of an enclosure for a vacuum extrusion chamber which includes a bulkhead with a pipe extending through the bulkhead supported by a bellows to permit limited relative movement between the pipe and the bulkhead.

Still another object is the provision of such extrusion apparatus wherein the pipe extending through the closure from the extruder is provided with a simplified jacket through which a heat exchange medium may be circulated.

Another object is the provision of a method of extruding foamable material into and through a vacuum chamber which comprises the steps of commonly mounting an extruder, a die and a closure for the chamber so that the extruder, die and closure may be moved toward the chamber with the closure being brought into sealing relationship with the chamber so that a vacuum may be created in the chamber and the foamable material extruded through the die into the chamber for expansion therein.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a top plan view illustrating the upper end of the barometric leg or vacuum chamber and showing the position of the tandem extruders and the end closure for the chamber with the lower end or remaining portion of the chamber being broken away;

FIG. 2 is an enlarged fragmentary vertical section taken through the upper or entrance end of the chamber and through the end closure as seen from approximately the line 2—2 of FIG. 1;

FIG. 3 is a transverse vertical section taken substantially on the line 3—3 of FIG. 2 showing the end closure in elevation;

FIG. 4 is an enlarged sectional detail of the end closure abutting against the end of the chamber;

FIG. 5 is a vertical section taken substantially from the line 5—5 of FIG. 2 illustrating the clamp between the extruder and pipe;

FIG. 6 is an enlarged view partially broken away and in section illustrating the pipe between the extruder and the die; and FIG. 7 is a somewhat schematic elevation illustrating the drive mechanism for moving the extruders and the end closure as a unit toward and away from the vacuum chamber.

DESCRIPTION OF THE PREFERRED EMBODIMENT

Referring now to the drawings and more particularly to FIG. 1, there is illustrated a vacuum chamber shown generally at 10 and a tandem extruder system shown generally at 12, the latter being housed in building 13 while the former is supported on inclined ramp 14 extending downwardly at a shallow angle to a pool of water some distance away and not shown. Walkways may be provided on either side of the vacuum chamber as seen at 15 leading to a lower building or structure which may house the pool and finishing area for the extruded product. The vacuum chamber or barometric leg 10 may be substantial in length so that the building 13 is substantially elevated above the pool of water into which the lower end of the vacuum chamber extends.

The building 13 at the upper end of the vacuum chamber is provided with a horizontal floor slab 20 on which the tandem extruders are supported. The extruder system illustrated comprises a somewhat smaller mixing extruder 21 feeding a somewhat larger cooling extruder 22. The output of the mixing extruder is fed laterally into the cooling extruder as indicated at 23 in conventional fashon for tandem extrusion systems. Both extruders are mounted for movement toward and away from the vacuum chamber 10 on respective sets of rails shown at 25 and 26. Raw materials such as virgin or recycled styrene pellets and other components may be fed to the hopper 27 of the extruder 23 from the storage silos 28 and 29 through the flexible lines seen at 30 and 31, respectively. A blowing or foaming agent may be fed from source 33 through flexible line 34 into the mixing extruder.

It will be appreciated that in lieu of the tandem system shown, that either a single or tandem system may be used with either including one or more static mixers such as interfacial surface generators.

The output end of the cooling extruder is connected by means of clamp 36 to adapter pipe 37 extending through bulkhead or end closure 40 for the vacuum chamber 10 to extrusion die 42, all as seen more clearly in FIG. 2.

The vacuum chamber 10 for the most part comprises an elongated pipe of significant diameter such as from 1.25 to 2 meters, such pipe being made up of a plurality of interconnected end-to-end sections seen at 45 and 46 in FIG. 1, some of which may be held down by large U-shape straps seen at 47 and 48, which may be anchored and tied down on each side of the pipe as depicted at 50. The tie-downs are desirable because of the significant axial pressure on the closure 40 when the chamber is evacuated. The chamber may be evacuated by a suitable vacuum pump indicated at 52. The subatmospheric pressure within the chamber may be closely controlled by a bleed valve 53 which may be opened to permit air to enter the chamber.

For further details of the construction of the inclined barometric leg which may be employed with the present invention, reference may be had to applicant's copending application entitled "Extrusion Appartus and Method", Ser. No. 922,541, Filed July 10, 1978.

The axially elongated leg may be inclined at approximately 5°14 25° so that the upper end face of the leg seen at 55 is inclined at approximately 65°–85°, and is of course normal to the inclined axis of the vacuum chamber. Such upper end face 55 may be provided with a flanged bearing ring 57 with its radial flange 58 seated against the end face 55 and its axial flange 59 telescoping into the I.D. of the upper end of the chamber. The ring may be secured and sealed in place by a suitable grout composition indicated at 60 more clearly in FIG. 4. Secured to the face of the radial flange 58 is a suitable air seal 62. Such air seal may take the form of a compressible foamed elastomeric tape simply adhered to the face of the flange 58.

The end closure 40 comprises a relatively heavy fabricated weldment which includes an annular ring 64 to which is welded domed plate 65. Welded to the exterior of the domed plate 65 are four pairs of lugs seen at 67, 68, 69 and 70 more clearly in FIG. 3. Such lugs are employed to support the closure and bulkhead 40 on a carriage 72.

The carriage comprises two longitudinal frame members 73 and 74 interconnected by two transverse frame members 75 and 76. The transverse frame member 76 is at the approximate mid-point of the longitudinal frame members so that the latter will straddle the upper end of the vacuum chamber when the bulkhead is in its extended vacuum chamber closing position as seen in FIGS. 1 and 2. The carriage 72 may be supported for movement generally axially of the vacuum chamber on parallel rails 78 and 79 by means of rollers 80. Such rails are parallel to the rails supporting the extruders and may be of an inverted V configuration with the rollers having V grooves therein.

The transverse frame member 76, as seen more clearly in FIG. 3, is provided with two brackets seen at 82 and 83 which include upstanding ears 84 and 85, respectively, which are connected to the pairs of lugs 69 and 70 on the lower exterior of the bulkhead by the pins seen at 86 and 87, respectively.

The transverse frame 75 is also provided with laterally spaced brackets 89 each of which is provided with a pair of ears 90 to which struts 91 and 92 are connected by pins 93. Such struts at their upper ends are connected by pins 94 and 95 to the paired lugs 67 and 68 on the exterior of the bulkhead. Such struts may be provided with slightly longitudinally elongated slots accommodating such pins so that adjustments 96 may be provided so that the bulkhead may adjustably be supported at the desired inclination to be parallel to the end face 55 of the vacuum chamber when in the closed position shown.

As seen more clearly in FIG. 3, the bulkhead may be provided with three cylindrical extensions 98, 99 and 100 welded thereto with the end faces thereof being closed by plates 101, 102 and 103, respectively. The plates 101 and 102 may be transparent and employed as viewing ports so that visual access to the interior of the bulkhead may be obtained. The plate 103 may be used as a utility airlock junction or passage plate to permit various power or plumbing connections to be made through the bulkhead such as electrical power for illumination, thermocouples, or the like, or for heat exchange media for the die to pass through the bulkhead.

The bulkhead is also provided with a more centrally located cylindrical extension 105 through which the adapter pipe 37 extends and by means of which such pipe is connected to and sealed with respect to the bulkhead. The adapter pipe 37 is connected to the extruder 22 through the releasable clamp 36 and includes a fitting 106 provided with a beveled flange 107 cooperating with a similar fitting on the output of the extruder. As seen more clearly in FIG. 5, the clamp includes two semi-circular clamp members 108 and 109 adapted to receive the mating beveled flanges to draw the same together in secured sealing relationship when the relatively large clamp fasteners 110 and 111 on either side thereof are tightened. The top clamp member is supported for vertical movement on the screw 112 operated by handwheel 113 extending through bracket 114 on the output end of the extruder 22. In this manner the clamp elements 108 and 109 may be vertically separated without completely disassembling the same.

As seen more clearly in FIGS. 2 and 6, the adapter pipe is provided with a slight elbow 116 and the outlet end is threaded as seen at 117 and connected and sealed to plate 118.

The plate 118 has an exterior circular configuration and is secured to one flanged end of stainless steel bellows 120 by clamping ring assembly 121. The opposite flanged end of the bellows is secured by clamping ring assembly 122 to the cylinder 105. The end of the pipe beyond the plate 118 is secured to fitting 123 which is part of the die 42.

The bellows construction shown not only provides the desired vacuum seal of the pipe through the bulkhead, but also permits limited relative movement of the pipe both axially of the bulkhead and somewhat laterally.

Between the extruder and the die or at least the adapter plate 118, the adapter pipe 37 is provided with an insulating jacket 125 seen in better detail in FIG. 6. The jacket is spaced from the exterior of the tube by a spirally wound wire 127 which functions not only to space the jacket uniformly from the pipe, but also to provide a spiral passage therethrough. The wire is welded to the pipe at each end as indicated at 128 and 129 to close the ends of the jacket. The wire need not be completely welded to the pipe or jacket throughout its length but need only be tack welded where required.

The jacket is provided with an inlet fitting or elbow 130 and an outlet fitting 131. A heat exchange medium may be circulated through the jacket such as hot oil or water to maintain the extrudate in the pipe 37 at the desired temperature as it passes from the extruder to the die 42.

The die 42 may be of the type shown in applicant's co-pending application entitled "Foam Extrusion Die Assembly", Ser. No. 914,580, Filed June 14, 1978. Such die preferably has adjustable top and bottom lips controlling the configuration of the orifice 133. Such orifice may be controlled by a plurality of adjustment screws 134 for each lip which may be rotated through universal joints 135 driven by rods 136 extending through the bulkhead in the manner shown more clearly in FIG. 4. Since there are three adjustments for the top and bottom lips, three separate rods may be employed extending through the bulkhead for each lip. Each rod 136 extends through a boss 137 secured, as by welding, to the bulkhead shell, each boss being provided with one or more ring seals seen at 138. The outer end of each rod may be squared as seen at 139 to facilitate rotation thereof. In this manner the lips of the die may be adjusted externally of the vacuum chamber and the closure during operation of the extrusion line. It will be appreciated that the die may be provided with more or fewer adjustments than those illustrated, in which case more or fewer remote drives would be provided or at least used.

When the vacuum chamber is closed the die orifice 133 will be properly aligned with the elongated vacuum chamber or barometric leg so that extrudate moving from the orifice will pass properly between belt conveyors 142 and 143 seen in FIG. 2. As shown in applicant's prior U.S. Pat. No. 4,044,084, the top conveyor may extend the entire length of the vacuum chamber exiting through the pool at the lower end.

Movement of the extruders and the bulkhead and die coupled thereto may be obtained, for example, by the relatively simple mechanism seen in FIG. 7. A drive chain 145 may be anchored to the floor at each end as seen at 146 and 147. The chain passes about two idler sprockets 148 and 149 and a drive sprocket 150 from the output of gear motor 151. The idler sprockets as well as the gear motor may be supported from a bridge plate 152 extending between the extruders.

In this manner the drive motor may be employed to move both extruders as well as the bulkhead and die coupled thereto toward and away from the end of the vacuum chamber 10. It is noted that the bulkhead includes no clamps or fasteners to connect it to the vacuum chamber since atmospheric pressure is entirely adequate to hold the extruders and bulkhead in the position seen in FIG. 2. The bulkhead and extruders cannot of course be moved away from the vacuum chamber until the subatmospheric pressure within the chamber is returned to substantially atmospheric pressure. If the bulkhead is disconnected from the extruders, it can, absent a vacuum in the chamber, be rolled away from or toward the chamber by hand or a simplified pulley or winch system.

It can now be seen that there is provided a vacuum extrusion process and apparatus for foam extrusion lines wherein a closure or bulkhead for the vacuum chamber is coupled to the extruders for movement therewith as a unit to open and close the chamber providing ready access to the interior of the chamber and equipment therein.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. In a method of extruding a foamable material into a vacuum chamber comprising the steps of mounting an extruder, a die, and a closure for such chamber therebetween for movement toward and away from such chamber, moving said extruder, die and closure as a unit or separately toward such chamber to close the same, creating a vacuum in such chamber, and extruding such foamable material through the die into the chamber for expansion therein.

2. A method as set forth in claim 1 wherein the die has adjustable lips, and adjusting the lips externally of such chamber when the latter is closed.

3. A method as set forth in claim 1 including the step of holding such closure against the chamber to close the same by atmospheric pressure acting on the exterior of the closure when the vacuum is created.

4. A method as set forth in claim 1 including the step of connecting the extruder and die by a pipe extending through the closure, and supporting the pipe with respect to the closure for limited relative movement.

5. A method as set forth in claim 1 including the step of connecting the extruder and die by a pipe extending through the closure, and insulating such pipe between the extruder and closure.

6. A method as set forth in claim 1 including the step of connecting the extruder and die by a pipe extending through the closure, such pipe including a jacket therearound, and circulating a heat exchange through such jacket about such pipe between the extruder and closure.

7. A method as set forth in claim 1 including the step of orienting the closure and die to be properly aligned with the chamber only when closed.

8. In combination, a vacuum chamber, a bulkhead for closing the chamber, an extruder and die on opposite sides of said bulkhead connected therewith, and means to move the extruder, bulkhead and die as a unit or separately toward and away from the chamber.

9. The combination set forth in claim 8 wherein said chamber is axially inclined with an inclined end face, and said bulkhead is inclined to be parallel to the end face.

10. The combination set forth in claim 8 wherein said bulkhead is supported on a carriage separate from the extruder.

11. The combination as set forth in claim 8 wherein said bulkhead is supported on a carriage separate from the extruder, and said bulkhead and extruder are interconnected by a pipe extending through the bulkhead.

12. The combination set forth in claim 11 including support means interconnecting said pipe and bulkhead to permit limited relative movement therebetween.

13. The combination set forth in claim 12 wherein said support means comprises a bellows extending substantially axially of the pipe.

14. The combination set forth in claim 11 including an insulating jacket surrounding said pipe and having a spiral passage therein.

15. The combination set forth in claim 14 wherein said spiral passage is formed by wire wrapped around said pipe.

16. The combination set forth in claim 11 including a separate carriage for said bulkhead, and releasable coupling means operative to interconnect said pipe and thus said bulkhead to said extruder.

17. The combination set forth in claim 8 including a separate carriage for said bulkhead, said carriage including a frame operative to straddle said chamber when closed by the bulkhead.

18. The combination set forth in claim 17 wherein said bulkhead is domed and supported in an inclined position to mate with an end of the chamber when thereagainst.

19. The combination set forth in claim 8 including means extending through said bulkhead operative to adjust said die.

20. The combination set forth in claim 19 wherein said last mentioned means includes a screw driven through a universal joint by a rod extending through said bulkhead.

21. The combination set forth in claim 8 wherein the means to move the extruder bulkhead and die comprises a drive chain secured at each end and wrapped around a motor driven sprocket.

22. In combination, an axially elongated vacuum extrusion chamber, rail means extending axially of said chamber at one end thereof, an extruder for said chamber mounted on said rail means for movement therealong, and an end closure for said chamber also mounted on said rail means for movement toward and away from said chamber to open and close the same, said extruder and end closure being releasably coupled together for movement in unison or separately.

23. The combination set forth in claim 22 wherein said rail means for said end closure straddles said vacuum chamber.

24. The combination set forth in claim 23 wherein said end closure is mounted on a carriage mounted on said rail means, said carriage also including a frame straddling said chamber in the closed position thereof.

25. The combination set forth in claim 24 wherein said frame supports said end closure at an inclined position.

26. The combination set forth in claim 25 including adjustable strut means supporting said end closure at an angle parallel to the end face of the vacuum chamber to be closed.

27. The combination set forth in claim 26 including a pipe coupling the end closure and extruder for such movement in unison.

28. The combination set forth in claim 27 including drive means for moving the extruder and thus said end closure.

29. The combination set forth in claim 28 including spring means supporting and sealing said pipe with respect to said end closure.

30. An end closure for a vacuum extrusion chamber comprising a bulkhead for closing such chamber, a pipe extending through said bulkhead, and means interconnecting said pipe and bulkhead to permit limited relative movement therebetween.

31. An end closure as set forth in claim 30 wherein said last mentioned means comprises a bellows extending generally axially of said pipe.

32. An end closure as set forth in claim 31 wherein said bellows is stainless steel.

33. An end closure as set forth in claim 31 wherein said end closure comprises a domed fabricated steel weldment, a cylinder secured thereto and extending axially therethrough, said bellows being secured to said cylinder.

34. An end closure as set forth in claim 33 wherein said bellows comprises an axial extension of said cylinder on the interior of said bulkhead.

35. An end closure as set forth in claim 34 including a jacket surrounding said pipe inside said cylinder and bellows, and means operative to circulate fluid therethrough to control the temperature in said pipe.

36. In combination, a vacuum chamber, a closure for said chamber, an extruder, a pipe extending from said extruder through said closure, a jacket surrounding said pipe between said extruder and closure, and means to circulate a heat exchange medium through said jacket.

37. The combination set forth in claim 36 including a spiral passage through said jacket.

38. The combination set forth in claim 37 wherein said spiral passage is formed by a wire wrapped around said pipe inside said jacket.

39. A closure for a vacuum extrusion chamber including a die supported internally thereon, said die including an adjustable die lip, and means externally of said closure to adjust said lip.

40. A closure as set forth in claim 39 including screw means operative to adjust said die lip.

41. A closure as set forth in claim 40 including means to rotate said screw means externally of said closure.

42. A closure as set forth in claim 41 wherein said last mentioned means comprises a shaft extending through said closure, and a universal joint interconnecting said shaft and screw means.

43. In combination, a vacuum chamber having an inclined end face, a closure for said end face, and an extrusion die supported by said closure having an outlet orifice extending normal to said end face.

44. The combination set forth in claim 43 wherein said vacuum chamber is an inclined barometric leg.

45. The combination as set forth in claim 44 wherein said leg is generally cylindrical and said closure is circular.

46. The combination as set forth in claim 44 including means to move said closure horizontally toward and away from the upper end of said leg.

47. The combination as set forth in claim 46 including means to support said closure for such horizontal movement while adjustably holding said closure inclined parallel to said end face.

48. In combination, a vacuum chamber having an inclined end face, a closure for said end face, and support means mounting said closure for movement toward and away from said end face, said support means including means to hold said closure in a plane parallel to said end face at all positions thereof.

49. The combination set forth in claim 48 wherein said support means comprises a carriage, and means supporting said closure on said carriage.

50. The combination set forth in claim 49 including means to move said carriage toward and away from said chamber.

51. The combination set forth in claim 50 wherein said last mentioned means comprises an extruder.

52. The combination set forth in claim 51 including a pipe extending from said extruder through said closure to a die on the opposite side thereof.

53. The combination set forth in claim 52 including spring means supporting yet sealing said pipe through said closure.

* * * * *